United States Patent [19]

Kitchel et al.

[11] Patent Number: 4,629,749

[45] Date of Patent: Dec. 16, 1986

[54] CLARITY OF LOW DENSITY POLYETHYLENE COMPOSITIONS CONTAINING ANTI-BLOCK AGENTS BY ADDITION OF POLYETHYLENE GLYCOL

[75] Inventors: Frank T. Kitchel, Hanover Park; R. Sven Solvik, Barrington; Michael L. Opacich, Hoffman Estates, all of Ill.

[73] Assignee: Enron Chemical Company, Rolling Meadows, Ill.

[21] Appl. No.: 758,392

[22] Filed: Jul. 24, 1985

[51] Int. Cl.$^4$ ................................................. C08K 9/00
[52] U.S. Cl. ..................................... 523/200; 524/275
[58] Field of Search ......................... 523/200; 524/275

[56] References Cited

U.S. PATENT DOCUMENTS

| | | |
|---|---|---|
| 2,991,264 | 7/1961 | Monroe, Jr. et al. . |
| 3,028,355 | 4/1962 | Toy et al. . |
| 3,293,206 | 12/1966 | Horne . |
| 3,408,320 | 10/1968 | Brucksch . |
| 3,425,980 | 2/1969 | Baum . |
| 3,425,981 | 2/1969 | Puletti et al. . |
| 3,594,204 | 7/1971 | Nease . |
| 3,658,980 | 4/1972 | Caiola et al. . |
| 3,956,230 | 5/1976 | Gaylord . |
| 4,013,622 | 3/1977 | DeJuneas et al. . |
| 4,327,009 | 4/1982 | Allen et al. . |
| 4,415,691 | 11/1983 | Allen et al. . |

FOREIGN PATENT DOCUMENTS 961998  1/1975  Canada .

OTHER PUBLICATIONS

Advances in Chemistry Series 125 ACS, Washington D.C. (1973), "Fractionation of Linear with Gel Permeation Chromatography", pp. 98–107.

*Primary Examiner*—Joseph L. Schofer
*Assistant Examiner*—N. Sarofim
*Attorney, Agent, or Firm*—Donald F. Haas

[57] ABSTRACT

A method is disclosed for improving the clarity of polyethylene film containing silica or diatomaceous earth as an anti-blocking agent. The method comprises treating the anti-blocking agent with polyethylene glycol such that sufficient polyethylene glycol is deposited on said anti-blocking agents so that the weight ratio of said polyethylene glycol to said anti-blocking agent is at least about 1:30. Next, the treated anti-blocking agent is added to the polyethylene resin and this blend is formed into a film.

5 Claims, No Drawings

CLARITY OF LOW DENSITY POLYETHYLENE COMPOSITIONS CONTAINING ANTI-BLOCK AGENTS BY ADDITION OF POLYETHYLENE GLYCOL

BACKGROUND OF THE INVENTION

The present invention relates to the improvement of the clarity of low density polyethylene film containing anti-block agents. More specifically, the invention relates to the use of polyethylene glycol as an agent to enhance the see-through clarity of low density polyethylene film containing such anti-block agents.

Thin low density polyethylene homopolymer and copolymer and linear low density polyethylene films possess many properties, such as inertness to chemicals, mechanical strength, low moisture vapor permeability, and transparency, which make it desirable as a wrapping and packaging material. However, there is a tendency for adjacent surfaces of such polyethylene film to adhere to one another when subjected to even slight pressure. This phenomenon of thin sheets of film sticking to one another when superimposed is called "blocking" and tends to make the film undesirable for many applications.

It has been known for some time that the "blocking" tendencies of such polyethylene film can be counteracted by the addition of anti-blocking agents to the polymer from which the film is made. Finely divided silica and diatomaceous earth have long been used as anti-blocking agents in polyethylene films. See for example U.S. Pat. Nos. 2,991,264, 3,028,355, and 3,293,206. Polyethylene films which incorporate these materials tend to have a see-through clarity which is unacceptable or at least poor for many commercial applications, especially in the blown film area. These materials do not have as great an effect on the see-through clarity in cast film because cast films inherently have much better see-through clarity than blown films.

It is an object of this invention to provide a method for improving the clarity of polyethylene films, especially blown films, which contain finely divided silica or diatomaceous earth as an anti-blocking agent. Still another object of this invention is to accomplish this improvement in see-through clarity without materially affecting other physical properties of the polyethylene film.

SUMMARY OF THE INVENTION

The objects of the present invention are accomplished by treating the anti-blocking agent (finely divided silica or diatomaceous earth) with polyethylene glycol such that sufficient polyethylene glycol is deposited on the anti-blocking agent so that the weight ratio of the polyethylene glycol to the anti-blocking agent is at least about 1:30, preferably 1:20, in the final polyethylene blend. Next, the treated anti-blocking agent is mixed with the polyethylene resin and a film is formed from this blend. The film has a higher see-through clarity than film formed by a blend in which no polyethylene glycol is present or from a blend in which the polyethylene glycol is not first added to the anti-blocking agent before addition thereof to the film resin.

DETAILED DESCRIPTION OF THE INVENTION

The polyethylene resins used in the present invention are well known as is their method of manufacture. This invention is applicable for low density polyethylene, linear low density polyethylene, which is really a copolymer of ethylene and an alpha olefin having four or more carbon atoms, and copolymers of ethylene with other monomers. Such other monomer which can be copolymerized with ethylene and used in the present invention includes alpha olefins, and vinyl compounds such as vinyl esters including vinyl acetate, vinyl propionate, vinyl butyrate, and vinyl benzoate, and acrylic acids and their esters including acrylic acid, methacrylic acid, ethylacrylate, methyl methacrylate, and ethyl ethacrylate. Thus, copolymers which can be used in the present invention include ethylene vinyl acetate, ethylene acrylic acid, ethylene methacrylic acid, ethylene ethylacrylate, ethylene methyl methacrylate, and ethylene ethyl ethacrylate, among others.

The use of finely divided silica and diatomaceous earth as an anti-blocking agent is very well known and their method of preparation and use need not be discussed in any detail here. Polyethylene glycol is a condensation polymer of ethylene glycol having the general formula $HOCH_2(CH_2OCH_2)_nCH_2OH$ or $H(OCH_2CH_2)_nOH$. Such polymers have average molecular weights generally ranging from about 200 to about 6,000 but they can range up to 20,000 to 200,000 and even up to four million. They range from clear, colorless, odorless, viscous liquids to solids and are soluble or miscible with water and for the most part with alcohol and other organic solvents. They are generally derived by condensation of ethylene glycol or of ethylene oxide and water. Their method of manufacture is well known. Union Carbide manufactures a variety of such polymers under the trademark "Carbowax".

It is extremely important in order to achieve the advantages of the present invention that the anti-blocking agent first be treated with the polyethylene glycol before it is added to the film resin. This method has been found to be superior in improving see-through clarity to the methods of merely adding all of the components together at the same time.

The treatment of the anti-blocking agent with polyethylene glycol can be accomplished simply by dissolving polyethylene glycol in an appropriate solvent, such as acetone, water, chloroform, alcohols, and most polar solvents, and then mixing in the anti-blocking agent to form a well blended slurry. Acetone is preferred because of its relatively low boiling point. The solvent is then evaporated, thereby depositing the polyethylene glycol on the surface of the anti-blocking agent. The treated anti-blocking agent is then added to the film resin, either directly or by first making it into a masterbatch which is then added to the film resin. This is one method for treating the anti-blocking agent, but other methods may be used, such as melting the polyethylene glycol and coating the surface of the anti-blocking agent therewith. Any method which achieves a uniform coating may be used.

It is important in order to achieve the advantages of this invention that the weight ratio of polyethylene glycol to the anti-blocking agent be at least about 1:30, preferably 1:20, in the final polyethylene blend. If the weight ratio is lower than 1:30, then the improvement in see-through clarity is insufficient. Accordingly, it is normally not necessary to use more than about 500 parts per million of polyethylene glycol in the final film blend. Generally, this amount is sufficient and more is economically wasteful. If more polyethylene glycol is used, at some point (perhaps above 1,000 parts per million) unrelated properties of the film may be adversely affected. It is important that as little polyethylene glycol as possible be used in order to avoid possible undesirable side effects.

The anti-blocking agent, diatomaceous earth or silica, microscopically roughens the otherwise very smooth surface of the film. A widely known liability of these anti-blocking agents is their adverse effect on the see-through clarity of the film. Film see-through clarity is often quantified by measuring the narrow angle scattering (NAS) of a transmitted beam of visible light through the film. The greater the numerical NAS value, the greater the see-through clarity of the film for a given thickness. The presence of anti-blocking agents in the film will scatter this light as it passes through the film. Thus, an object viewed through the film will appear blurred. In general, the greater the anti-blocking agent concentration, the poorer the NAS value.

EXAMPLE I

Four pounds of polyethylene glycol (hereinafter referred to as "PEG") (trade name Carbowax 4600) were dissolved in acetone. Twenty pounds of diatomaceous earth anti-blocking agent (hereinafter referred to as "AB") (brand Celite 219) were added to the solution and the acetone was evaporated off. The ratio of PEG:AB was 1:5. The PEG coated AB was melt blended with an equal weight of a carrier resin which is low density ethylene vinyl acetate copolymer with a melt index of 8.0 and a vinyl acetate concentration of 3.0 weight percent to produce a 50/50 masterbatch. Untreated AB was also blended with the same carrier resin and made into a 50/50 masterbatch to serve as a control. The treated AB masterbatch and the control masterbatch were melt blended into the same barefoot resin, which was a 2.0 melt index, 0.925 density polyethylene homopolymer, such that the final concentration of AB was 1,000 ppm. The resin containing the treated AB masterbatch had 200 ppm polyethylene glycol. The two resins were blown into 1.25 mil film. The NAS values for the film made with the treated AB masterbatch and the control masterbatch were 71 and 54, respectively.

EXAMPLE II

This example is the same as Example I except that the ratio of PEG:AB in the AB masterbatch was 1:10 (PEG = 100 ppm in the final resin blend). The NAS values for the film made with the treated AB masterbatch and the control masterbatch were 70 and 54, respectively.

EXAMPLE III

This example is the same as Example I except the ratio of PEG:AB in the AB masterbatch was 1:20 (PEG = 50 ppm in the final resin blend). The NAS values for the film made with the treated AB masterbatch and the control masterbatch were 70 and 54, respectively.

EXAMPLE IV

Five pounds of PEG (trade name Carbowax 4600) were dissolved in 20 gallons of acetone. The solution was added to 100 pounds of AB (brand Celite 219) and blended for four hours in a ribbon blender as the acetone was evaporated off. The ratio of PEG:AB was 1:20. The PEG coated AB was melt blended with an equal weight of the carrier resin of Example I in a Banbury to produce a treated AB masterbatch. Again, untreated anti-block agent was blended with this carrier resin and made into a 50/50 masterbatch to serve as a control. The treated AB masterbatch and the control masterbatch were melt blended into the same barefoot resin as used in Example I such that the final concentration of AB was 1,000 ppm. The resin containing the treated AB masterbatch had 50 ppm PEG. The two resins were blown into 1.25 mil film. The NAS values for the film made with the treated AB masterbatch and the control masterbatch were 55 and 51, respectively.

EXAMPLE V

The treated AB masterbatch described in Example IV was melt blended into a polyethylene resin with a melt index of 1.8 and density of 0.923. The resulting product contained 1,472 ppm anti-block agent and 81 ppm polyethylene glycol. The control for this experiment was produced immediately following the above lot on the same equipment without pretreatment with polyethylene glycol. The control contained 1,400 ppm anti-block. The two resins were blown into a 1.25 mil film. The NAS values for the film made with the treated AB masterbatch and the control masterbatch were 61 and 41, respectively.

The five preceeding examples show the advantage of the method of the present invention over the prior art. In each case, the see-through clarity, as measured by NAS value, of the film formed according to the method of the present invention was higher than the see-through clarity of film formed according to prior commercial practice without the benefit of the polyethylene glycol pretreatment.

EXAMPLE VI

Equal weights of the low density polyethylene from Example I and AB (trade name Celite 219) were melt blended in a Banbury to produce a 50/50 AB masterbatch containing no polyethylene glycol. This masterbatch was let down into the barefoot resin of Example I, via Banbury process, such that the concentration of AB was 1,000 ppm. The barefoot resin was also run through a Banbury as a control so that the resins were exposed to the same heat history. The resin containing the masterbatch and the barefoot resin were blown into 1.25 mil film. The NAS values for the film blown from the barefoot resin and the resin containing the masterbatch were 72 and 52, respectively. This example shows that the see-through clarity of the film from the barefoot resin without the anti-block agent is much better than the film from the same resin with anti-block agent incorporated therein.

EXAMPLE VII

This example is the same as Example VI except the AB masterbatch used was a 50/50 AB masterbatch of Celite 219 and a different polyethylene resin (melt index of 7.0 and 0.917 density) containing no polyethylene glycol. The NAS values for the film made from the barefoot resin and the AB master-batch were 72 and 54, respectively. This example shows that the see-through clarity of the film from the barefoot resin without the anti-block agent is much better than the film from the same resin with anti-block agent incorporated therein.

EXAMPLE VIII

A general purpose clarity homopolymer polyethylene resin having a melt index of 1.1 g/10 min. and a density of 0.925 g/cc, containing 1,000 ppm of antiblocking agent was melt blended with varying amounts of PEG as shown in Table I. As indicated by the data presented in Table I, the amount of anit-block agent was kept constant as 100, 200, 300, 400, 500 and 1,000 ppm of PEG was added to the film resin. The corresponding ratios of PEG:AB and NAS values are also given. Table II outlines the data presented in Examples I, II, and III and is provided for comparison. Comparing similar PEG:AB ratios (i.e., Sample B vs. Sample 3 and Sample C vs. Sample 4), the data indicates that PEG treated anti-block samples (according to this invention) have improved NAS over the samples where the PEG was directly added. Also, comparing Sample B with Sample 2 (or Sample C with Sample 3) indicates that the treated anti-block method gives greater NAS at a lesser PEG level. This is economically desirable and also lessens the probability of potential adverse film properties occurring at the higher PEG concentrations.

TABLE I

| Direct Addition of PEG to Film Resin | | | | | | | |
|---|---|---|---|---|---|---|---|
| Sample | A | B | C | D | E | F | G |
| PEG, ppm | 0 | 100 | 200 | 300 | 400 | 500 | 1000 |
| AB, ppm | 1000 | 1000 | 1000 | 1000 | 1000 | 1000 | 1000 |
| PEG:AB | 0 | 1:10 | 1:5 | 1:3.3 | 1:2.5 | 1:2 | 1:1 |
| NAS, % | 52 | 64 | 66 | 67 | 67 | 67 | 64 |

TABLE II

| Treated Anti-Block Addition of PEG to Film Resin | | | | |
|---|---|---|---|---|
| Sample | 1 | 2 | 3 | 4 |
| PEG, ppm | 0 | 50 | 100 | 200 |
| AB, ppm | 1000 | 1000 | 1000 | 1000 |
| PEG:AB | 0 | 1:20 | 1:10 | 1:5 |

TABLE II-continued

| Treated Anti-Block Addition of PEG to Film Resin | | | | |
|---|---|---|---|---|
| Sample | 1 | 2 | 3 | 4 |
| NAS | 54 | 70 | 70 | 71 |

We claim:

1. In a method for forming polyethylene films which comprises incorporating an anti-blocking agent into polyethylene resin and then forming a film from this blend, the improvement which comprises treating the anti-blocking agent with polyethylene glycol prior to addition of the anti-blocking agent to the polyethylene resin such that sufficient polyethylene glycol is deposited on said anti-blocking agent that the weight ratio of polyethylene glycol to said anti-blocking agent is at least about 1:30 in the final polyethylene blend and no more than 1,000 parts per million of the total film content.

2. The method of claim 1 wherein the anti-blocking agent is treated with polyethylene glycol by first dissolving polyethylene glycol in a solvent, then mixing the anti-blocking agent with the solution to form a well blended slurry, and then evaporating the solvent, thereby depositing the polyethylene glycol on the surface of the anti-blocking agent.

3. The method of claim 1 wherein the polyethylene glycol is first melted and then coated onto the surface of the anti-blocking agent.

4. The method of claim 1 wherein the weight ratio of polyethylene glycol to anti-blocking agent is at least about 1:20 in the final polyethylene blend.

5. The method of claim 4 wherein the molecular weight of the polyethylene glycol is from about 200 to about 6,000.

* * * * *